(12) United States Patent
Takemoto

(10) Patent No.: US 8,045,228 B2
(45) Date of Patent: Oct. 25, 2011

(54) IMAGE PROCESSING APPARATUS

(75) Inventor: Yuji Takemoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 748 days.

(21) Appl. No.: 12/048,733

(22) Filed: Mar. 14, 2008

(65) Prior Publication Data

US 2008/0231879 A1    Sep. 25, 2008

(30) Foreign Application Priority Data

Mar. 19, 2007    (JP) ................... 2007-071449

(51) Int. Cl.
*H04N 1/40*    (2006.01)

(52) U.S. Cl. .................... 358/2.1; 358/468; 358/400

(58) Field of Classification Search .............. 358/1.9, 358/2.1, 400, 402–403, 406, 448, 462, 464, 358/468

See application file for complete search history.

(56) References Cited

U.S. PATENT DOCUMENTS

| | | | | |
|---|---|---|---|---|
| 5,513,013 A | * | 4/1996 | Kuo ............................ | 358/448 |
| 5,530,520 A | * | 6/1996 | Clearwater ................. | 399/366 |
| 7,551,312 B1 | * | 6/2009 | Hull et al. ................... | 358/1.18 |
| 7,813,595 B2 | * | 10/2010 | Nagarajan et al. .......... | 382/305 |
| 7,853,629 B2 | * | 12/2010 | Duncan et al. .............. | 707/821 |

FOREIGN PATENT DOCUMENTS

| | | |
|---|---|---|
| JP | 11-73415 | 3/1999 |
| JP | 2000-59610 | 2/2000 |
| JP | 2000-331027 | 11/2000 |
| JP | 2001-264892 | 9/2001 |
| JP | 2003-150636 | 5/2003 |
| JP | 2005-142943 | 6/2005 |
| JP | 2006-94476 | 4/2006 |
| JP | 2006-279236 | 10/2006 |
| JP | 2006-315403 | 11/2006 |
| JP | 2006-323501 | 11/2006 |
| JP | 2006-528388 | 12/2006 |

* cited by examiner

*Primary Examiner* — Thomas D Lee
*Assistant Examiner* — Stephen M Brinich
(74) *Attorney, Agent, or Firm* — Cooper & Dunham LLP

(57) ABSTRACT

An image processing apparatus including a data inputting part for inputting image data, a document recognizing part for recognizing the image data as a document, a document storing part for storing document data corresponding to the document recognized by the document recognizing part, and a stored document managing part for managing the document data stored in the document storing part is disclosed. The image processing apparatus has a document analyzing part configured to analyze the input image data, a text writing part configured to obtain an analysis result from the document analyzing part and write the analysis result in a text format, a part configured to associate the analysis result to the document data stored in the document storing part and register the analysis result in correspondence with the document data, and a part configured to search for a target document by referring to the registered analysis result.

7 Claims, 8 Drawing Sheets

FIG.8

| STORED DOCUMENT (1) | STORED DOCUMENT (2) | STORED DOCUMENT (3) |

FILE NAME: ABCD | FILE NAME: ABC | FILE NAME: XYZ

REGISTERED BY: MR./MS. TOKYO | REGISTERED BY: MR./MS. TOK | REGISTERED BY: MR./MS. KYOTO

REGISTERED ON: 2006/12/25 11:30 | REGISTERED ON: 2006/12/25 11:40 | REGISTERED ON: 2006/12/20 10:00

IMAGE INFORMATION: A4, 600 dpi, DARK | IMAGE INFORMATION: A4, 200 dpi, PALE | IMAGE INFORMATION: A3, 600 dpi, NORMAL COMMENT COLUMN: GOOD DAY, I AM X. | COMMENT COLUMN: GOOD DAY | COMMENT COLUMN: GOOD EVENING

DOCUMENT TO BE STORED

FILE NAME: ABCD

REGISTERED BY: MR./MS. TOKYO

REGISTERED ON: 2006/12/25 11:30

IMAGE INFORMATION: A4, 600 dpi, DARK

COMMENT COLUMN: GOOD DAY, I AM X.

IMAGE PROCESSING APPARATUS

BACKGROUND OF THE INVENTION

1. Technical Field

This disclosure relates to an image processing apparatus such as a copier, a printer, or an MFP (multi-function peripheral) capable of storing and reusing image data input from various paths, and more particularly to an image processing apparatus capable of easily searching for a desired document from a vast amount of image data stored as documents.

2. Description of the Related Art

In recent years and continuing, image processing apparatuses including copiers, printers, and MFPs (Multi-Function Peripherals) are provided with various functions for satisfying the needs of the user. Accordingly, various image data (data which can be output in the form of images) are input to the image processing apparatus from various paths such as from a scanner or a network connected to the image processing apparatus.

Furthermore, the input image data are stored in a hard disk of the image processing apparatus, a removable recording medium (e.g., an SD (Secure Digital) card), or an outside server so that the image data can be reused whenever necessary.

Such image processing apparatus is often shared by many users. Thus, as the amount of documents stored in the image processing apparatus increases, the burden of searching for a document increases for the user in a case of reusing the document.

In a typical method of obtaining a document from documents stored in an image processing apparatus, a desired document is found by analyzing the content of the document and narrowing down the stored documents by using an obtained word (character string) as a key for the search. Examples of such method are disclosed in Japanese Laid-Open Patent Application Nos. 11-73415, 2000-331027, and 2003-150636.

However, conventionally, in a case of obtaining a document for reuse with an image processing apparatus (e.g., MFP), the user is required to select a desired document from a list of stored documents displayed by the image processing apparatus. Typically, the image processing apparatus is not equipped with a document searching function. One reason that the document searching function is not provided to the image processing apparatus is the lack of processing ability of the image processing apparatus. However, the method of searching for a document by using a word described in the document as a key for the search may not be suitable for an image processing apparatus (e.g., MFP) which is configured to process input image data. This is another reason that document searching function is not provided to the image processing apparatus.

BRIEF SUMMARY

In an aspect of this disclosure, there is provided an image processing apparatus including a data inputting part for inputting image data, a document recognizing part for recognizing the image data as a document, a document storing part for storing document data corresponding to the document recognized by the document recognizing part, and a stored document managing part for managing the document data stored in the document storing part, the image processing apparatus further including: a document analyzing part configured to analyze the input image data; a text writing part configured to obtain an analysis result from the document analyzing part and write the analysis result in a text format, wherein the stored document managing part is configured to associate the analysis result to the document data stored in the document storing part and register the analysis result in correspondence with the document data, and is further configured to search for a target document by referring to the registered analysis result.

In another aspect of this disclosure, there is provided an image processing apparatus including a data inputting part for inputting image data, a document recognizing part for recognizing the image data as a document, a document storing part for storing document data corresponding to the document recognized by the document recognizing part, and a stored document managing part for managing the document data stored in the document storing part, the image processing apparatus including: a similar document extracting part configured to determine similarity between the input image data and the document data stored in the document storing part and extract the document data having document identifying information similar to that of the input image data, wherein the stored document managing part is configured to associate the document identifying information to the input image data and the extracted document data and register the document identifying information in correspondence with the stored document data, and is further configured to search for a target document by referring to the registered document identifying information.

In another aspect, there is provided an image processing apparatus including a data inputting part for inputting image data, a document recognizing part for recognizing the image data as a document, a document storing part for storing document data corresponding to the document recognized by the document recognizing part, and a stored document managing part for managing the document data stored in the document storing part, the image processing apparatus including: a document analyzing part configured to analyze the input image data; a text writing part configured to obtain an analysis result from the document analyzing part and write the analysis result in a text format; a similar document extracting part configured to determine similarity between the input image data and the document data stored in the document storing part and extract the document data having document identifying information similar to that of the input image data; a part configured to associate the analysis result to the document data stored in the document storing part and register the analysis result in correspondence with the document data, wherein the stored document managing part is configured to associate the document identifying information to the input image data and the extracted document data and register the document identifying information in correspondence with the stored document data, and is further configured to search for a target document by referring to the registered analysis result.

The aforementioned and other aspects, features and advantages will become more apparent from the following detailed description when read in conjunction with the accompanying drawings.

BRIEF DESCRIPTION OF THE DRAWINGS

FIG. 8 is a schematic diagram for describing a relationship between a document and document information and search information used for extracting similar documents according to an embodiment of the present invention.

DETAILED DESCRIPTION OF THE PREFERRED EMBODIMENTS

Next, an MFP (Multi-Function Peripheral) 100 is described as one embodiment of an image processing apparatus of the present invention.

The MFP 100 provides a combination of functions including, for example, a copier function, a printer function, a facsimile function, and a scanner function. The image data generated by these functions are printed out or output to outside apparatuses (e.g., PC facsimile).

According to an embodiment of the present invention, image data, which are input when the copier function, the printer function, the facsimile function, and the scanner function are used by the MFP 100, are stored as documents in units of process requests. The stored documents are managed in a manner enabling reuse of the image data. For example, the stored documents may be printed out, output to an outside apparatus, or used for browsing.

Although the management of the documents can be conducted by installing a component (e.g., computer program) for realizing necessary functions in the MFP 100, the management of documents can also be conducted by sending the data of the documents to a managing apparatus (e.g., management server) connected through a network and entrusting the management of the documents to the managing apparatus.

Figure 1:
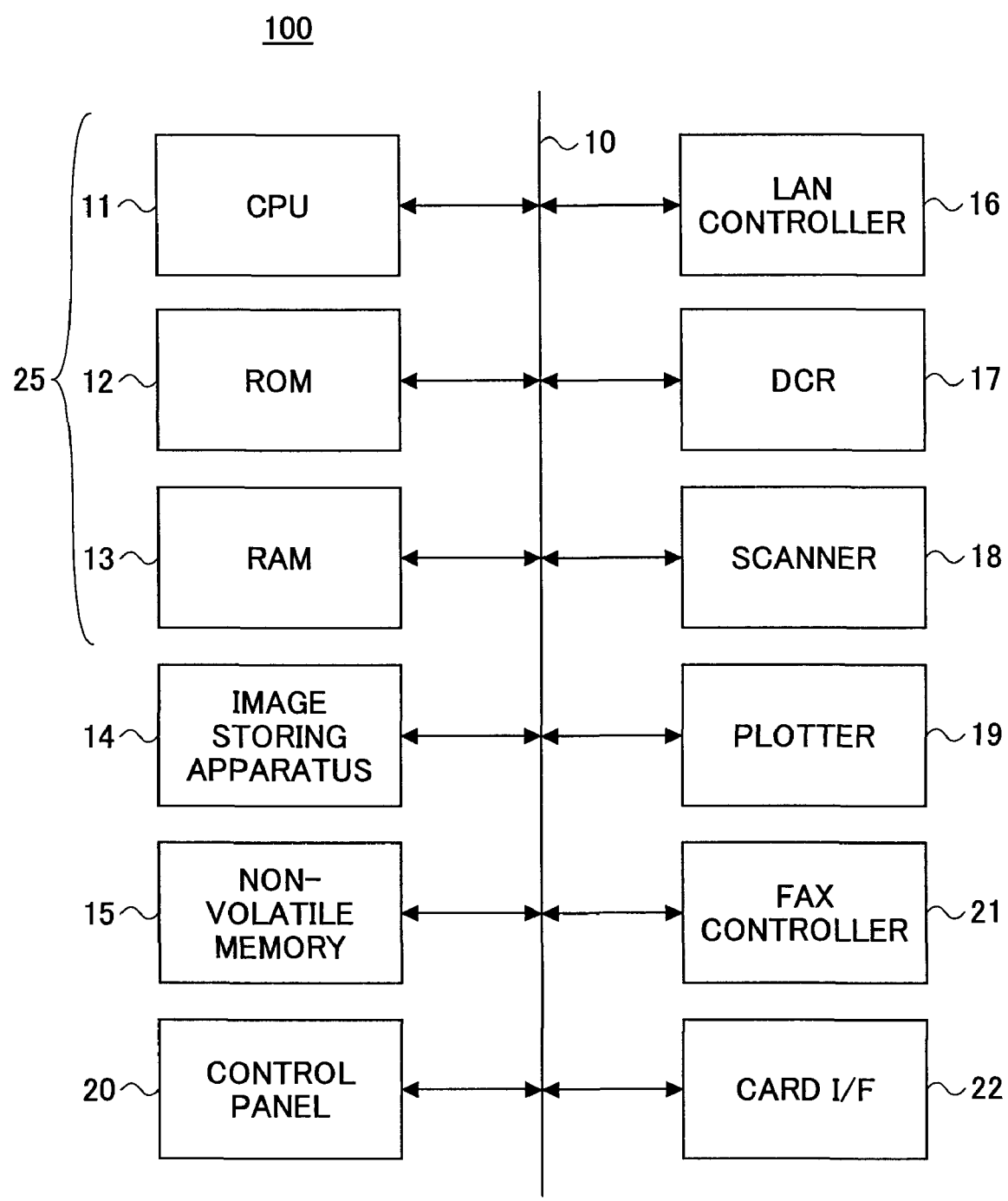
FIG. 1 is a block diagram showing an exemplary hardware configuration of an MFP according to an embodiment of the present invention.

FIG. 1 is a block diagram showing a basic configuration of hardware of the MFP 100 according to an embodiment of the present invention. The hardware configuration of the MFP 100 shown in FIG. 1 includes a CPU (Central Processing Unit) 11 serving as a calculating apparatus for operating software (program), a ROM (Read Only Memory) 12 serving as a memory device for storing programs and a RAM (Random Access Memory) 13 serving as a memory device for operating programs and temporarily storing data. The CPU 11, the ROM 12, and the RAM 13 serve as a system control part 25. It is to be noted that the programs stored in the ROM include a program for performing processes required for the below-described document management.

The system control part 25, in accordance with corresponding programs, controls various hardware devices of the MFP 100 in accordance with the stored programs. In this example, the system control part 25 controls an image storing apparatus 14, a non-volatile memory 15, a LAN (Local Area Network) controller 16, a DCR 17, a scanner 18, a plotter 19, a control panel 20, a fax controller 21, and a card I/F 22 for realizing the functions provided to these devices.

The image storing apparatus 14 is a storing apparatus that stores image data obtained via the scanner 18, the LAN controller 16, or the FAX controller 21 by using a recording medium having a relatively large capacity (e.g., hard disk). According to an embodiment of the present invention, image data, which is input as a processing target, is stored as a document in units of a process request in the image storing apparatus 14. Thereby, in a case of reusing the image data, image data corresponding to a designated document is read out from the image storing apparatus 14.

The non-volatile memory 15 is a non-volatile storing apparatus that is used for storing various data (e.g., initial settings) even where the power of the MFP 100 is turned off.

The LAN controller 16 is a controller that is used for connecting to a network such as Ethernet (Registered Trademark), or a wireless LAN.

The FAX controller 21 is a controller that is used for transmitting and receiving facsimile data via a public line (public network).

The DCR 17 is a converting apparatus that converts image data (bitmap) input by using a printer function, a facsimile function, or a scanner function into electronic documents.

The scanner 18 is a reading apparatus that converts paper documents into image data (bitmap).

The plotter 19 is an apparatus that prints out image data onto paper.

The card I/F 22 is an interface that connects with a removable card-like recording medium (e.g., an SD (Secure Digital) card) and exchanges data with the recording medium. The recording medium connected to the card I/F 22 can be used for the same purpose as the image storing apparatus 14. Accordingly, when the recording medium is connected to the card I/F 22, the recording medium serves as a location where documents are stored.

The control panel 20 is an apparatus for receiving a process request of a job or an execution command from the user via an operation screen of an LCD (Liquid Crystal Display) touch panel and for reporting the status of the execution of the requested job.

It is to be noted that exchange of data among devices are mainly conducted through an internal bus 10.

Next, a process of storing image data input to the MFP and managing the stored image data according to an embodiment of the present invention is described.

Upon receiving a process request, the MFP 100 shown in FIG. 1 recognizes documents in units of processes according to a command input to the control panel 20 by the user or a command requesting a process from an outside apparatus via the LAN controller, stores the recognized documents in units of documents, and conducts a process in accordance with the requested process request.

In the MFP 100, although image data are input to the MFP 100 from various paths, the respective functions of the MFP 100 (e.g., copier function, printer function, facsimile function) process the input image data as output image data of a predetermined format. For example, in a case of the copier function or the scanner function, the input image data are processed as bitmap image data read by the scanner 18. In a case of the printer function, the input image data are processed as bitmap image data depicted by decoding printing commands of PDL (Page Description Language) received via the LAN controller 16. In a case of the facsimile function, the input image data are processed as bitmap image data obtained by decoding facsimile signals received via the FAX controller 21.

Each of the processed documents is stored in the image storing apparatus 14 and used as data according to a currently requested process. After the process according to the current request is executed, the data of the processed document (document data) may be reused later on.

According to an embodiment of the present invention, each image data stored in the image storing apparatus 14 is managed as a document based on a single system. The data indicative of the location (address) of the documents stored in the image storing apparatus are managed in association with the stored documents (document data). Therefore, in a case of reusing the stored documents, the location (address) of a desired document is obtained by referring to the managed data. Then, the desired document is read out by designating the obtained location (address).

The MFP 100 according to an embodiment of the present invention is provided with a document searching function that enables easy selection of a document when designating a document to be reused from the stored documents.

The document storing function according to an embodiment of the present invention is set with the following search conditions (1) and (2).
(1) Searching through the contents of the stored documents having a matching arbitrary comment text part or a matching distinguishable shape or pattern.
(2) Searching through stored documents having a matching document information (e.g., document name, user name, document registration time/date, image attribute data) or documents obtained by the above-described search condition (1).

The arbitrary comment text part in the search condition (1) is a text part allowing comments to be arbitrarily added thereto. For example, in a case where the user personally knows a text part which can be effectively used as a search condition, the text part may be added as to the arbitrary comment text part (See "Comment Column" registered in each stored document of FIG. 8).

The search condition (2) is a condition for obtaining documents having a certain relation (connection) such as having the same document data item (e.g., document name, user name, document registration date, image attribute data). That is, with the search condition (2), a target document is searched based on the assumption that documents having a connection are similar. Accordingly, the range for conducting a search is expanded to similar documents. Thus, not only identical (matching) documents can be searched but also similar documents can be searched.

By providing an image processing apparatus 100 (e.g., MFP) having the document searching function including the above-described search conditions, the burden of the user can be reduced compared to the conventional method of searching from a list of stored documents displayed on a screen. Furthermore, such image processing apparatus 100 fulfills the needs of the user desiring to access a document by conducting a search from the aspect of similarity.

Furthermore, the search conditions (1) and (2) can be applied to the image processing apparatus 100 handling documents including image data and realize a thorough searching function.

In order to realize the above-described searching function according to an embodiment of the present invention, a target stored document is analyzed in view of search conditions, and the search data obtained by the analysis are associated to the stored document beforehand. This enables a more efficient and faster search.

Figure 2:
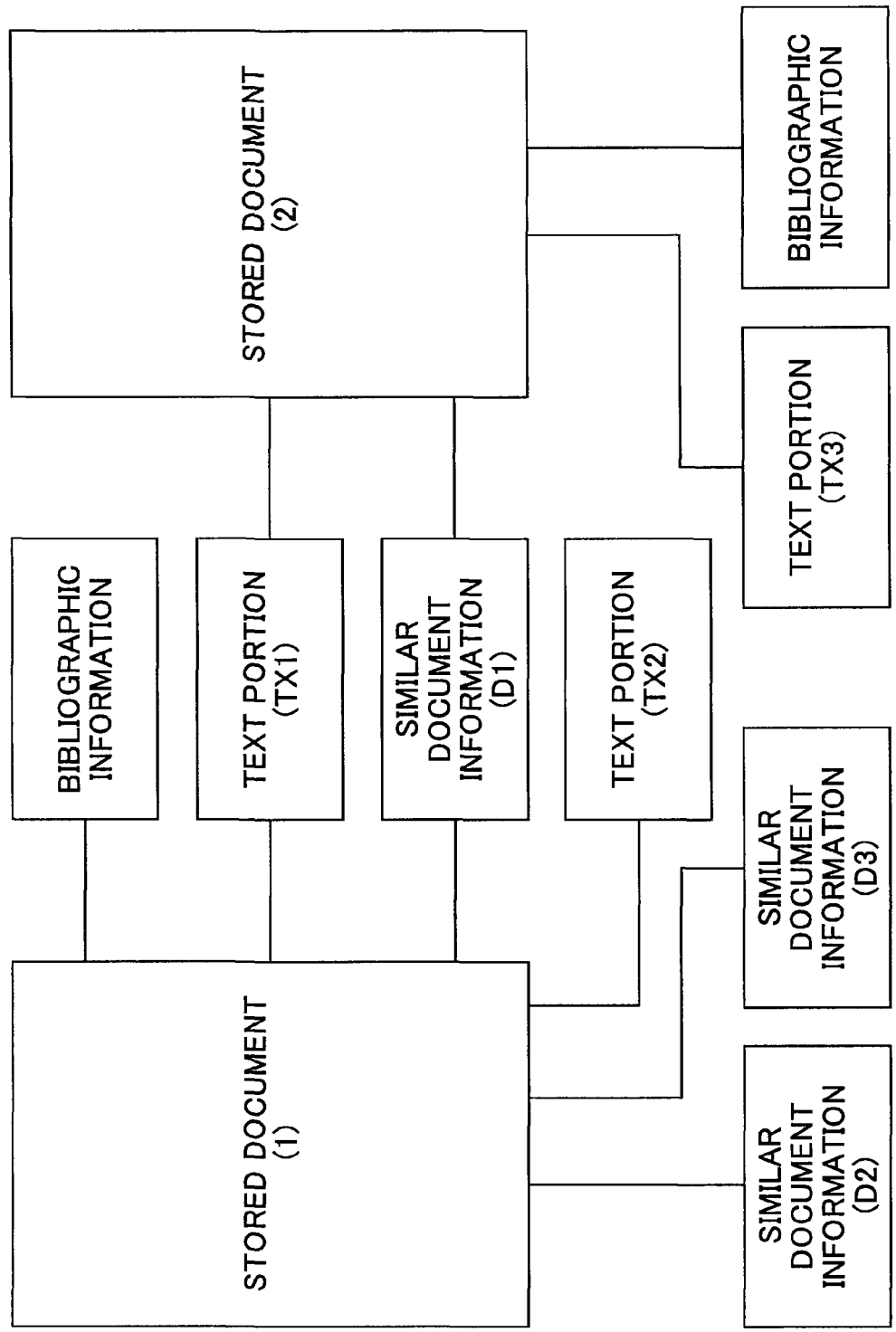
FIG. 2 is a schematic diagram showing an example of stored documents and search data associated to the stored documents according to an embodiment of the present invention.

FIG. 2 is a schematic diagram showing an example of stored documents and search data associated to the stored documents according to an embodiment of the present invention.

In FIG. 2, analysis is performed on a stored document (1) in view of search data (TX1) and (TX2) corresponding to the arbitrary text part of the search condition (1), and the search data obtained by the analysis are associated to the stored document (1). Furthermore, analysis is also performed on a stored document (2) in view of search data (TX1) and (TX3) corresponding to the arbitrary text part of the search condition (1), and the search data obtained by the analysis are associated to the stored document (2).

In the example shown in FIG. 2, since the search data (TX1) is related to both the stored document (1) and the stored document (2), the search data (TX1) can be used as the search condition (2). Accordingly, document data having similarity (similar document data) (D1), which serve as search data used for searching for similar documents, are associated (assigned) to each of the similar documents of the stored document (1) and the stored document (2), and registered in the image storing apparatus 14. It is to be noted, although FIG. 2 shows other similar document data (D2) and (D3), these similar document data (D2) and (D3) are associated (assigned) to other stored documents which are not illustrated in FIG. 2.

Furthermore, bibliographic data are data included in the stored documents. Although not shown in FIG. 2, in a case where there is a match of bibliographic data among the stored documents (e.g., stored document (A) and stored document (B), the bibliographic data can be used as the search condition (2). Accordingly, the search data used for searching for similar documents (in this case, the bibliographic data included in the stored documents (A) and (B)) are associated (assigned) to each of the stored documents (A) and (B), and registered in the image storing apparatus 14.

Various search data (search data items) obtained by analyzing the documents are registered with the stored documents based on the above-described method of associating the search data with the stored documents. The documents and the search data may be registered independently. Furthermore, plural documents (a group of documents) may also be associated to plural search data (a group of search data).

Figure 3:
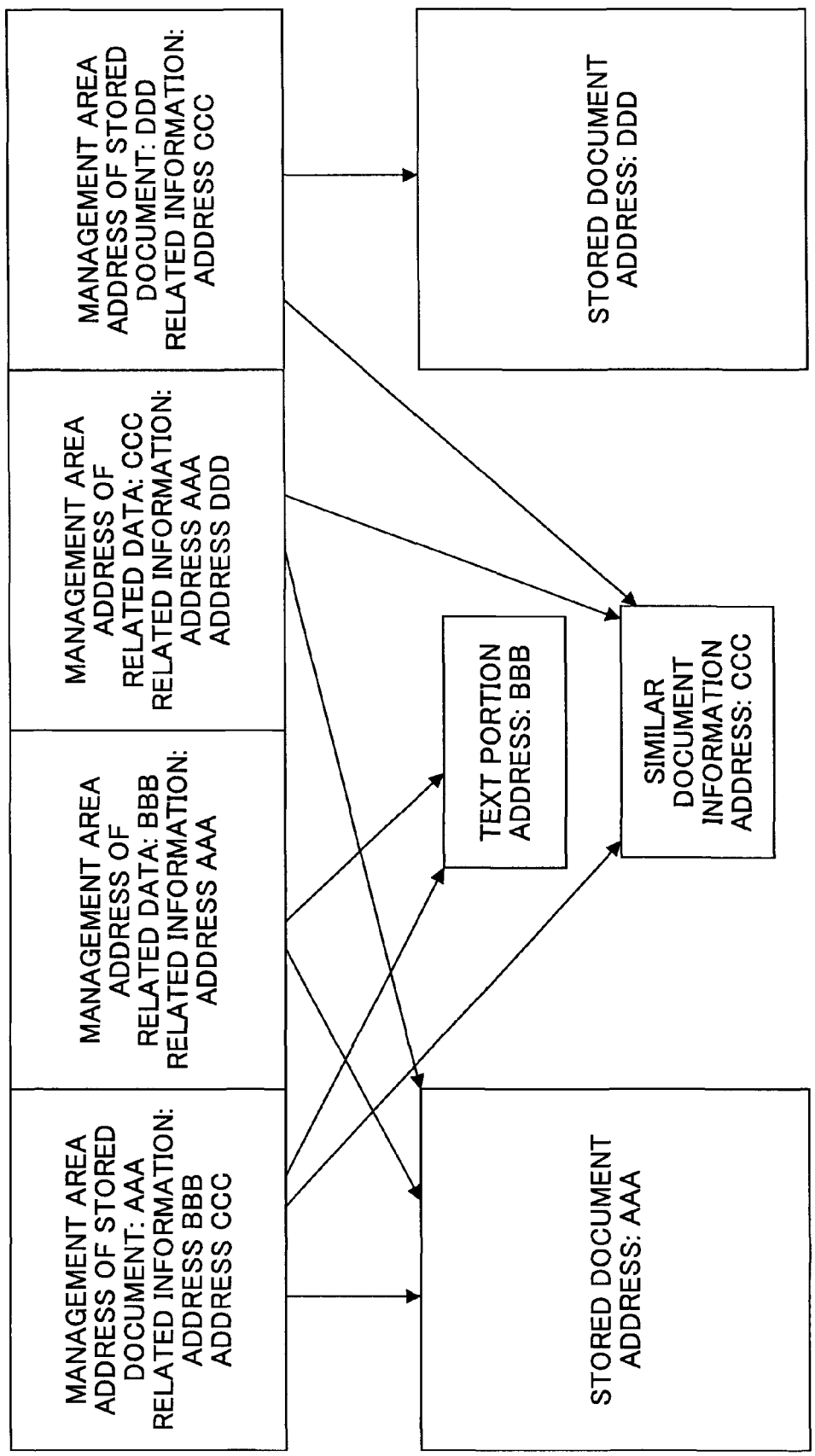
FIG. 3 is a schematic diagram showing an example of a management configuration used for managing registered search data according to an embodiment of the present invention.

FIG. 3 is a schematic diagram showing an example of a management configuration used for managing registered search data according to an embodiment of the present invention. The management configuration shown in FIG. 3 has an area for managing stored documents (stored document management area). The stored document management area includes memory addresses indicating the location of the stored documents and path data of a directory indicating the location of the stored documents in a hard disk (hereinafter also collectively referred to as "registration address"). The management configuration shown in FIG. 3 has another management area for managing the above-described arbitrary comment text part and the similar document data (hereinafter also collectively referred to as "related data") (related data management area). The related data management area also includes registration addresses.

The search data associated to the stored documents (hereinafter referred to as "related information") are provided in the related data management area. The related information include the registration address of the related data FIG. 4 is a schematic diagram showing another example of a management configuration used for managing registered search information according to an embodiment of the present invention.

Figure 4:
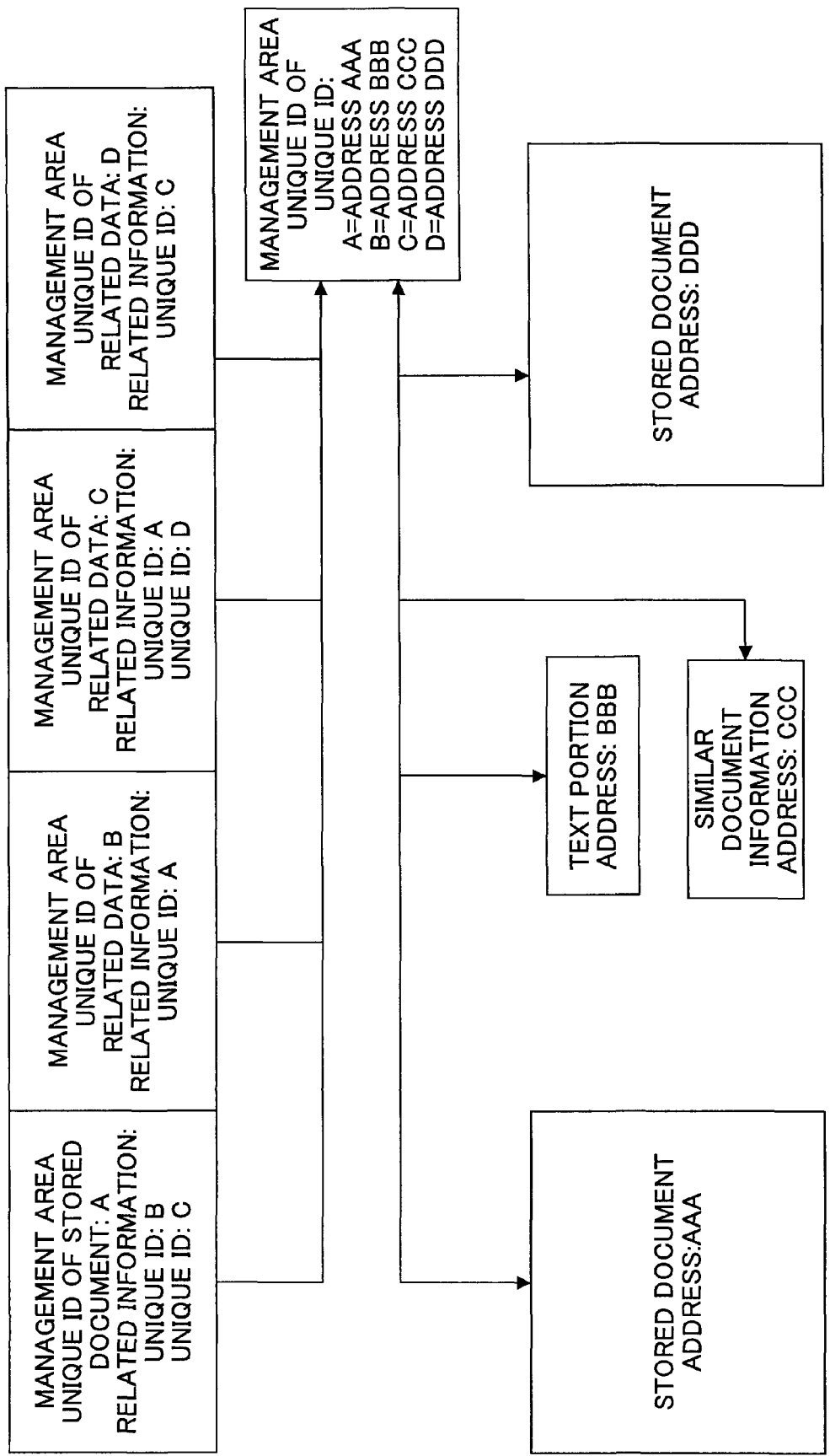
FIG. 4 is a schematic diagram showing another example of a management configuration used for managing registered search information according to an embodiment of the present invention.

In the management configuration shown in FIG. 4, registration addresses are managed according to unique IDs. Therefore, instead of registration addresses, unique IDs are inserted to the stored document management area and the related data management area. Furthermore, unique IDs of the related stored documents and related data are also inserted in the related information area.

The management configuration shown in FIG. 4 has an area for managing unique IDs. since registration addresses are managed by using unique IDs, Next, embodiments (first-third embodiment of the present invention) of analyzing a document (search target) beforehand based on the above-described search conditions (1) or (2) and registering the results of the analysis are described.

The first embodiment of the present invention is an embodiment where a document is analyzed based on the above-described search condition (1).

The second embodiment of the present invention is another embodiment where a document is analyzed based on the above-described search condition (1).

The third embodiment of the present invention is an embodiment where a document is analyzed based on the above-described search condition (2).

In the below-described embodiments 1 through 3 of the present invention, the process of registering search information obtained by analyzing a document is performed as a part of an operation for storing input documents (image data) upon receiving a process request. That is, in a case where image data to be processed (target image data) or data subordinate to the target image data are input in response to a request to process the target image data (process request) transmitted from the user via a control panel or from an outside apparatus via a network, search information obtained by analyzing the target image data is recorded during the operation of processing and storing the target image data, so that the obtained search information (analysis result) can be referred when reusing the image data.

First Embodiment

The first embodiment is an exemplary operation of analyzing a match of a pattern or a symbol having a distinguishable shape (see condition (1)) and registering the result obtained by the analysis.

Other than a character (letter), the content of the document may include a pattern or a symbol having a distinguishable shape (hereinafter also collectively referred to as "distinguishing pattern") may be used as a medium for carrying specific information. In this embodiment of the present invention, the distinguishing pattern is a pattern from which information cannot be read out by the human eye (e.g., a barcode, a tint block pattern or a digital watermarking pattern used for security purposes).

Accordingly, in the analysis, it is determined whether the distinguishing pattern is included in the image data of a document. In a case where the distinguishing pattern exists in the image data of document, the distinguishing pattern is registered as search information associated with the document. Thereby, in a case of reusing the document stored in the image storing apparatus 14, the registered search information can be used in searching for the stored document.

In a case of registering the search information, a comment, in correspondence with the analyzed distinguishing pattern, is registered in a text form. The comment is registered in a text form so that the distinguishing pattern can be comprehended by the user. The comment registered in a text form may be, for example, "tint block pattern A1", "tint block pattern A2", or "barcode 34", to thereby allow the user to differentiate each of the distinguishing patterns.

In a case where a search is performed by using a distinguishing pattern, the user is required to know the relationship between the comment and the distinguishing pattern beforehand. Thus, in a case of searching for a stored document, the user can search for the desired stored document by designating the desired stored document with the comment.

Figure 5:
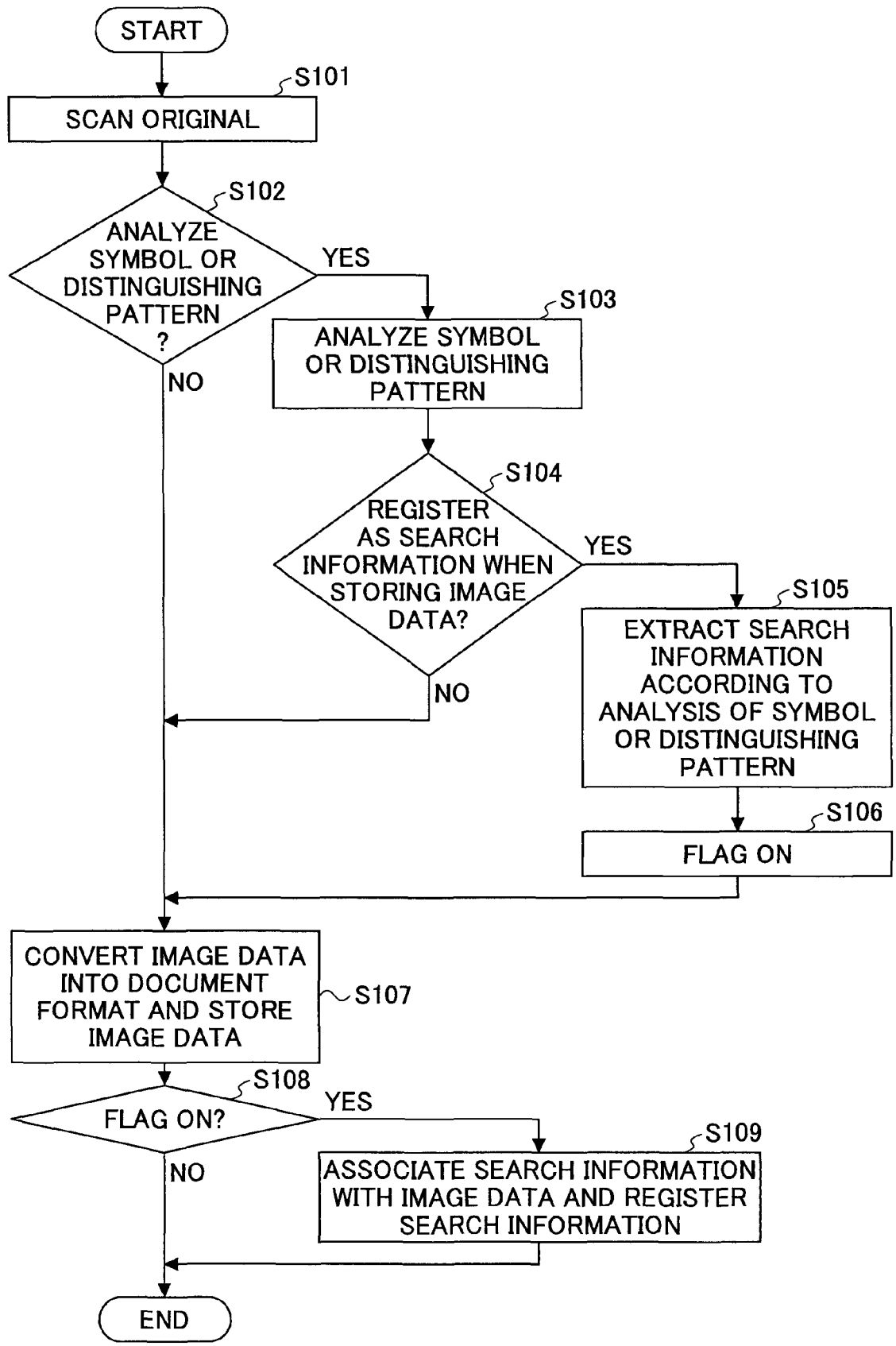
FIG. 5 is a flowchart showing a process of registering search information according to the first embodiment of the present invention.

FIG. 5 is a flowchart showing a process of registering search information according to the first embodiment of the present invention.

The below-described process of registering search information is conducted as a part of an operation conducted upon receiving a request for processing an image (process request). According to an embodiment of the present invention, the process shown in FIG. 5 is responsive to a request for a process using a copier function or a scanner function of the MFP 100 and is performed on an image which is input by scanning.

The operation shown in FIG. 5 is initiated upon receiving a process request transmitted from the control panel 20 operated by the user. First, the scanner 18 scans a document (original) (Step S101). In a scanning process according to an embodiment of the present invention, one or more documents placed on a tray of the MFP 100 are automatically successively fed and scanned. The data obtained by scanning the one or more documents are recognized as a single document wherein a single process is managed in correspondence with the single document. That is, a process is managed per document.

The input image data obtained by the scanning operation are processed (converted) into image data that can be printed out (printer output data) by the DCR 17. Then, the processed image data are stored in the image storing apparatus 14 (Step S107).

However, before reaching the step of storing the image data (i.e. Step S107), a step (process) of registering search information is performed during the operation shown in FIG. 5. This step is for obtaining search information by analyzing the processed input image data converted into data that can be output (printer output data).

In this embodiment of the present invention, the input image data are analyzed by determining whether a distinguishing pattern exists in the input image data. Whether to perform the analysis may be instructed by the user via the control panel 20. Accordingly, it is determined whether the analysis is instructed by checking the settings of the control panel 20 (Step S102).

In a case where analysis is not instructed according to the determination (No in Step S102), the operation proceeds to an image data storing step (Step S107).

On the other hand, in a case where analysis is instructed (Yes in Step S102), it is determined whether a distinguishing pattern exists in the image data (Step S103). In a case where there are one or more distinguishing patterns (including new patterns), all of the distinguishing patterns may be analyzed.

Then, it is determined whether the distinguishing pattern (analysis result) obtained by the analysis should be registered as search information (search key) (Step S104). Whether to register the obtained analysis result can be instructed by the user via the control panel 20. Accordingly, the determination is conducted by checking the settings of the control panel 20.

In a case where the registration of the analysis result is not instructed according to the determination (No in Step S104), the operation proceeds to the image data storing step (Step S107).

On the other hand, in a case where registration of the analysis result is instructed (Yes in Step S104), search information corresponding to the obtained distinguishing pattern (analysis result) is extracted (Step S105).

In this example, a comment in text format is attached as the search information corresponding to the obtained distinguishing pattern. For example, in a case where the obtained distinguishing pattern is a tint block pattern, the corresponding search information is expressed as a comment in text format, such as "tint block pattern A1", "tint block pattern A2" "tint block pattern . . . ". In a case where the obtained distinguishing pattern is already used (registered) as search information, a comment corresponding to the obtained distinguishing pattern is extracted. On the other hand, in a case where the obtained distinguishing pattern is to be newly used (registered) as search information, a new comment in text format is attached (assigned) to the obtained distinguishing pattern. Although a comment may be attached by the user, such process of attaching a comment may also be conducted automatically. For example, in a case where the distinguishing pattern is a tint block pattern, an unused comment (i.e. a comment not yet used as search information) "tint block pattern X" may be prepared beforehand and attached to the distinguishing pattern to be newly used as search information.

After extracting the search information corresponding to the obtained distinguishing pattern, a flag for performing a subsequent registration step is switched on (Step S106).

Then, the image data input by scanning an original with the scanner 18 is stored in a document format (Step S107). The image data are stored in a document format so that the stored image data can be managed as a document corresponding to a process when reusing the stored image data.

In a case where image data of an original are input (scanned) by the scanner 18, the scanned image data are recognized as a single document. A process subsequently performed on the image data is managed in correspondence with the single document. Accordingly, in Step S107, management information used in performing a process on the image data and the settings instructed by the user via the control panel 20 are associated to the document (image data) as attached (auxiliary) data and stored in the image storing apparatus 14 together with the document (image data).

In addition, along with the storing of the document (image data), the extracted search information corresponding to the analysis result (distinguishing pattern) is associated to the stored document and registered in correspondence with the stored document (Step S109).

This registration step is ignored, for example, in a case where no distinguishing pattern is obtained (analyzed) or a case where no search information is to be registered. Accordingly, it is determined whether the flag of Step S106 is ON (Step S108). In a case where the flag is ON (Yes in Step S108), the registration step of S109 is performed.

The operation of FIG. 5 is completed when the registration step is completed (Step S109) or when the registration step is ignored (No in Step S108).

Although FIG. 5 shows an exemplary operation for registering search information corresponding to image data of a document input (scanned) by the copier function or the scanner function of the MFP 100, image data may be input from other paths besides from the scanner 18. For example, image data of a document may be input in the form of a printing command in a PDL format, in the form of facsimile data, or in the form of electronic mail from an outside apparatus via a network (e.g., LAN).

In a case of registering search information corresponding to image data of a document received in the form of a printing command in a PDL format, the image data are subjected to the same above-described processes performed on the image data of a document input by scanning. That is, after image data of a document are obtained by decoding a PDL command, the image data are analyzed for obtaining a distinguishing pattern, search information is extracted based on the analysis result, and the search information is registered in association with the document stored in the image storing apparatus 14.

Moreover, in a case of registering search information corresponding to image data of a document received by facsimile or by electronic mail, the image data are subjected to the same above-described processes performed on the image data of a document input by scanning. That is, the image data is analyzed for obtaining a distinguishing pattern, search information is extracted based on the analysis result, and the search information is registered in association with the document.

In the above-described operation of registering search information according to an embodiment of the present invention, a document (image data) is processed and stored in response to a process request transmitted from a control panel by the user or a from an outside apparatus via a communication part along with analyzing the document for obtaining a distinguishing pattern (search information) and registering the obtained search information in association with the stored document.

Therefore, in a case of reusing the stored document, the search information associated to the stored document can be referred for achieving an effective search function.

Second Embodiment

The second embodiment is an exemplary operation of analyzing a match of an arbitrary text portion (see condition (1)) and registering the result obtained by the analysis.

For example, in a case where the content of a document includes a text portion considered to be an effective search condition by the user, the text portion is extracted as a comment and registered as search information (search key).

Accordingly, in the analysis, it is determined whether the text portion is included in the image data of a document. In a case where the text portion exists in the image data of document, the text portion is registered as search information associated with the document. Thereby, in a case of reusing the document stored in the image storing apparatus 14, the registered search information can be used in searching for the stored document.

In a case of registering the search information, a comment, in correspondence with the analyzed text portion, is registered in a text form that can be comprehended by the user. The text portion may be registered in a form as it is or registered with alternative text data.

In a case of searching for a stored document by using the text portion, the user is required to know the relationship between the comment and the text portion beforehand. Accordingly, the user designates the stored document to be searched by using the comment corresponding to the text portion, so that the desired stored document can be found by the search.

Figure 6:
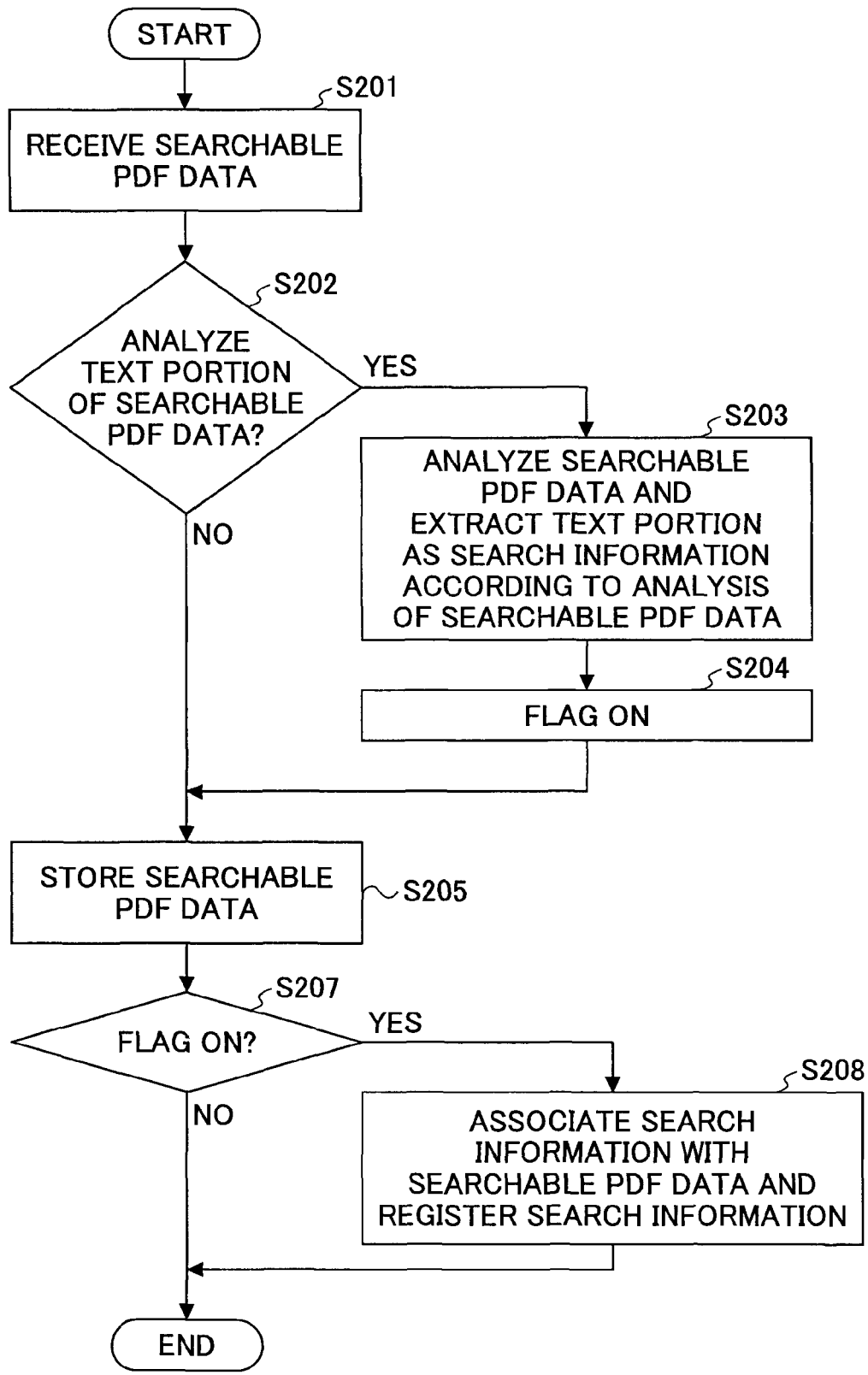
FIG. 6 is a flowchart showing a process of registering search information according to the second embodiment of the present invention.

FIG. 6 is a flowchart showing a process of registering search information according to the second embodiment of the present invention.

The below-described process of registering search information is conducted as a part of an operation conducted upon receiving a request for processing an image (process request). According to an embodiment of the present invention, the process shown in FIG. 6 is responsive to a request for a process using a printer function of the MFP 100 and is performed on an image which is input by reception of electronic mail transmitted through LAN. Furthermore, the input image of the electronic mail is received in the form of searchable PDF data.

The operation shown in FIG. 6 is initiated upon receiving a process request transmitted as electronic mail from a network (e.g., LAN). Therefore, first, searchable PDF data are received by electronic mail (Step S201). The searchable PDF data are already in a document format and recognized as a single document. Thus, a single process is managed in correspondence with the single document. That is, a process is managed per document.

The searchable PDF data obtained from the electronic mail are processed (converted) into image data that can be printed out (printer output data) by the DCR 17. Then, the processed image data are stored in the image storing apparatus 14 (Step S205).

However, before reaching the step of storing the image data (i.e. Step S205), a step (process) of registering search information is performed during the operation shown in FIG. 6. This step is for obtaining search information by analyzing the processed input searchable PDF data converted into data that can be output (printer output data).

In this embodiment of the present invention, the searchable PDF are analyzed by determining whether a text portion (effective search data) exists in the searchable data. Whether to perform the analysis can be instructed by the user via the control panel 20. Accordingly, it is determined whether the analysis is instructed by checking the settings of the control panel 20 (Step S202).

In a case where analysis is not instructed according to the determination (No in Step S102), the operation proceeds to an image data storing step (Step S205).

On the other hand, in a case where analysis is instructed (Yes in Step S202), it is determined whether the text portion exists in the image data by analyzing the searchable PDF data (Step S203). In a case where the text portion (analysis result) is determined to exist in the image data according to the analysis, the text portion is extracted as search information from the image data (Step S203). In a case where there are one or more text portions (including new text portions), all of the text portions may be analyzed.

Furthermore, in Step S203, a comment in text format is attached as the search information corresponding to the obtained text portion. In a case where the obtained text portion is already used (registered) as search information, a comment corresponding to the obtained text portion is extracted. On the other hand, in a case where the obtained text portion is to be newly used (registered) as search information, a new comment in text format is attached (assigned) to the obtained text portion. Although a comment may be attached by the user, such process of attaching a comment may also be conducted automatically.

After extracting the search information corresponding to the obtained text portion, a flag for performing a subsequent registration step is switched on (Step S204).

Then, the searchable PDF data input by electronic mail are stored in a document format (Step S205).

The searchable PDF data are already in a document format and recognized as a single document. Accordingly, a process subsequently performed on the image data is managed in correspondence with the single document. Accordingly, in Step S205, management information used for performing a process on the image data and the settings initially applied to the searchable PDF data (e.g., data initially set to the searchable PDF data by the sender of the electronic mail) are associated to the document (image data) as attached data (auxiliary data) and stored in the image storing apparatus 14 together with the document (image data).

In addition, along with the storing of the document (image data), the extracted search information corresponding to the analysis result (text portion) is associated to the stored document and registered in correspondence with the stored document (Step S208).

This registration step is ignored, for example, in a case where the analysis of the image data is not performed. Accordingly, it is determined whether the flag of Step S204 is ON (Step S207). In a case where the flag is ON (Yes in Step S207), the registration step of S208 is performed.

The operation of FIG. 6 is completed when the registration step is completed (Step S208) or when the registration step is ignored (No in Step S207).

Although FIG. 6 shows an exemplary operation for registering search information corresponding to searchable PDF data input by electronic mail via a LAN, the searchable PDF data may be input from other paths besides by reception of electronic mail. For example, searchable PDF data may be input in the form of PDL. In the case of registering search information corresponding to searchable PDF data in the form of PDL, the searchable PDF data are subjected to the same above-described processes performed on the searchable PDF data input by electronic mail. That is, after searchable PDF data are obtained by decoding a PDL command, the searchable PDF data are analyzed for obtaining a text portion, search information is extracted based on the analysis result, and the search information is registered in association with the document stored in the image storing apparatus 14.

Likewise, in a case of storing image data of a scanned document (original) in the form of searchable PDF data, the searchable PDF data are analyzed for obtaining a text portion, search information is extracted based on the analysis result, and the search information is registered in association with the document stored in the image storing apparatus 14.

Third Embodiment

The third embodiment is an exemplary operation of registering search information enabling similar documents to be searched (see condition (1)).

Documents are determined to be similar on condition that their document information match with each other or that their registered search information (see condition (1)) match with each other. That is, documents having matching document information or documents having matching search information are determined as similar documents.

Accordingly, documents satisfying the matching condition are extracted, associated with each other, and registered as search information enabling similar documents to be searched.

It is to be noted that "document information" is information of a document besides the content of a document. For example, the document information may include data regarding the attributes of an image (image attribute data) such as document name, file name (hereinafter also collectively referred to as "document name"), document management information (e.g., time/date of registering a document), size of the image (original), resolution.

In a case of storing a document according to the third embodiment of the present invention, it is determined whether there is a match of document information or search information between the document to be stored and a document(s) which is already stored, and a similar document(s) is extracted according to the determination.

In extracting the similar documents, specific information may be selected from document information or search information. Furthermore, the selected information may further be narrowed down by a condition requiring an exact match or a partial match, so that a similar document can be extracted more efficiently.

The search information of the similar documents may be specified to unique information of a document (e.g., stored location of the document), so that a document to be searched can be searched by referring to the specified search information.

Figure 7:
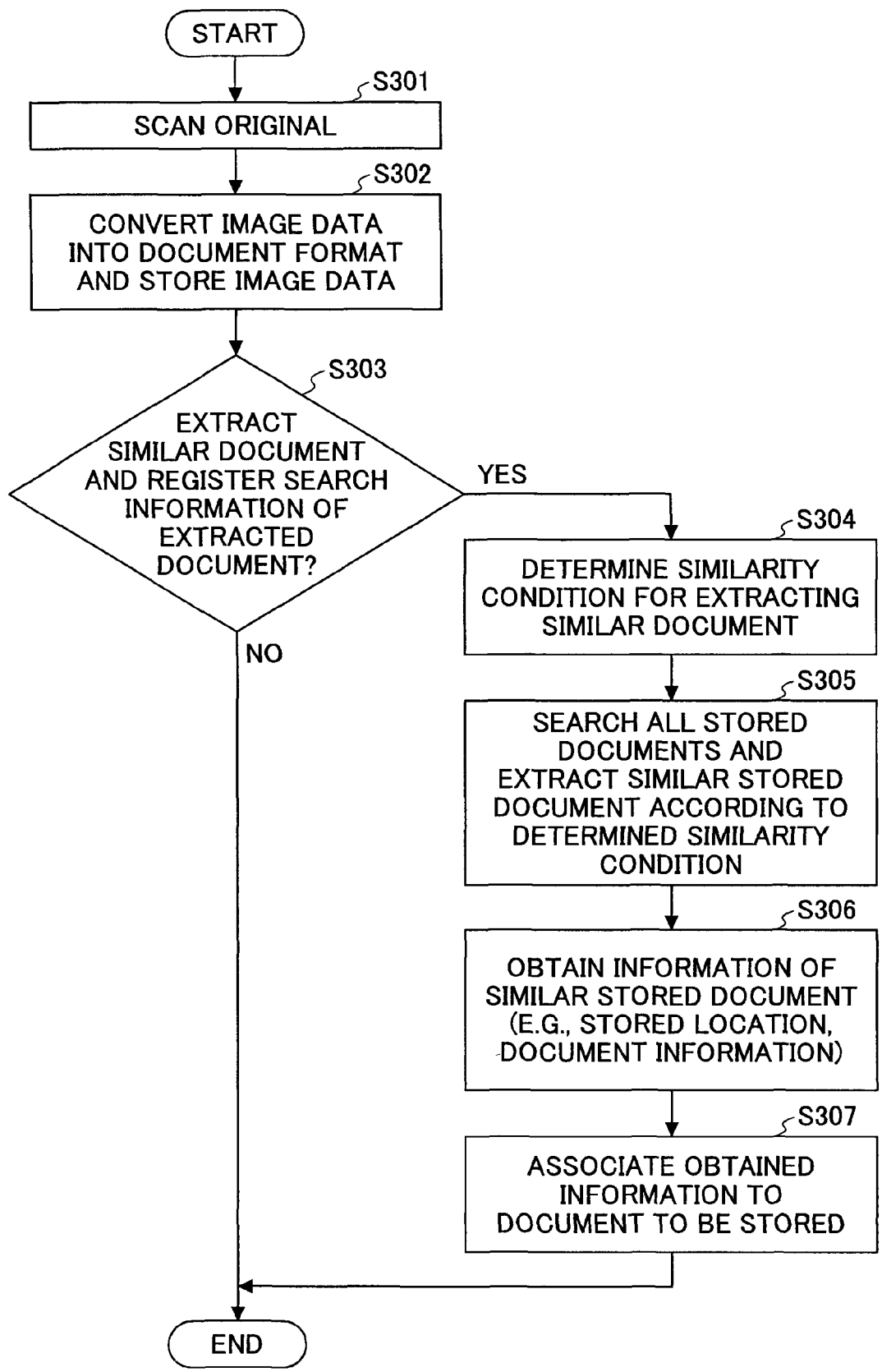
FIG. 7 is a flowchart showing a process of registering search information of similar documents according to the third embodiment of the present invention.

FIG. 7 is a flowchart showing a process of registering search information of similar documents according to the third embodiment of the present invention.

The below-described process of registering search information is conducted as a part of an operation conducted upon receiving a request for processing an image (process request). According to an embodiment of the present invention, the process shown in FIG. 7 is responsive to a request for a process using a copier function or a scanner function of the MFP 100 and is performed on an image which is input by scanning.

The operation shown in FIG. 7 is initiated upon receiving a process request transmitted from the control panel 20 operated by the user. First, the scanner 18 scans an original (Step S301). In a scanning process according to an embodiment of the present invention, one or more originals placed on a tray of the MFP 100 are automatically successively fed and scanned. The data obtained by scanning the one or more originals are recognized as a single document wherein a single process is managed in correspondence with the single document. That is, a process is managed per document.

The input image data (document) obtained by the scanning process are processed (converted) into image data that can be printed out (printer output data) by the DCR 17, and stored in the image storing apparatus 14 in a document format (Step S302).

The input image data are stored in the document format, so that the image data can be managed (handled) as a single document corresponding to a single process in a case where the stored image data (document) are reused.

In a case where image data are input by scanning one or more originals with the scanner 18, the data obtained by the scanning are recognized as a single document. A process subsequently performed on the image data is managed in correspondence with the single document. Accordingly, in Step S302, management information used in performing a process on the image data and the settings instructed by the user via the control panel 20 are associated to the document (image data) and stored in the image storing apparatus 14 together with the document (image data). The settings instructed by the user include various conditions for performing a desired process, such as image attribute data (e.g., resolution of the image or the density of the image).

After image data of a document (target document) are stored, a process for registering search data that enable searching of documents similar to the target document is conducted. In this embodiment of the present invention, whether to conduct the process of registering the search information may be instructed by the user via the control panel 20. Accordingly, it is determined whether the registration is instructed by checking the settings of the control panel 20 (Step S303).

In a case where the registration process is not instructed according to the determination (No in Step S303), the operation shown in FIG. 7 is completed.

On the other hand, in a case where the registration process is instructed (Yes in Step S303), the operation proceeds to a process of registering search information enabling searching of similar documents.

First, in the process of registering the search information, a similarity condition for extracting similar documents is determined (Step S304). In this determination step according to an embodiment of the present invention, it is determined which item should be selected as the similarity condition from the document information and search information. Furthermore, it is determined whether an exact match or a partial match is required for the item selected from the document information and search information.

In other words, with respect to the items in the document data (e.g., document management data including name of document (document name), name of user registering the document (user name), or time/date of registering the document (registration date) and the items in the search information (e.g., search keys associated to the stored documents), it is determined which item(s) should be selected for determining similarity and whether an exact match or a partial match should be the condition for determining match of the selected item. The determination may be based on the settings of the control panel 20.

For example, it is determined whether an exact match or a partial match is required in determining match of document name, user name, registration date, and search information.

A specific example where items corresponding to document management information (in this example, document name, user name, registration date), image attribute data (in this example, image (original) size, resolution, density), and search information (in this example, search key registered in association with a stored document) are selected for extracting similar documents is described below.

FIG. 8 is a schematic diagram for describing a relationship between a document and document information and search information used for extracting similar documents according to an embodiment of the present invention.

More specifically, FIG. 8 shows a comparison between a document to be stored (target document) and already stored documents (1)-(3) in view of various information stored in association with the corresponding documents.

In the example shown in FIG. 8, the document information includes the items "file name", "registrant (registered by . . . )", "registration time/date (registered on)", and "image data". Furthermore, in FIG. 8, the search information (search key) includes the item "comment column".

For example, in a case where the "file name" of a document is selected as a condition for extracting a similar document, a stored document having a similar (exact matching or partial matching) file name is determined as a similar document. In the example shown in FIG. 8, with respect to the file name "ABCD" of the document to be stored, stored document (1) is extracted in a case where an exact match is determined as the condition for extracting a similar document. Furthermore, stored documents (1) and (2) are extracted in a case where a partial match for a part of the file name "ABC" is determined as the condition for extracting a similar document.

In a case where the "user name" of a document is selected as a condition for extracting a similar document, a stored document having a similar (exact matching or partial matching) user name is determined as a similar document. In the example shown in FIG. 8, with respect to the user name "Mr./Ms. Tokyo" of the document to be stored, stored document (1) is extracted in a case where an exact match is determined as the condition for extracting a similar document. Furthermore, stored documents (1) and (2) are extracted in a case where a partial match for a part of the user name "Mr./ Ms. Tok" is determined as the condition for extracting a similar document.

In a case where the "registration time/date" of a document is selected as a condition for extracting a similar document, a stored document having a similar (exact matching or partial matching) registration time/date is determined as a similar document. In the example shown in FIG. 8, with respect to the registration time/date "2006/12/25 11:30" of the document to be stored, stored document (1) is extracted in a case where an exact match is determined as the condition for extracting a similar document. Furthermore, stored documents (1) and (2) are extracted in a case where a partial match for a part of the registration time/date "2006/12/25 11:" is determined as the condition for extracting a similar document, and stored documents (1), (2), and (3) are extracted in a case where a partial match for a part of the registration time/date "2006/12" is determined as the condition for extracting a similar document.

In a case where image attribute data such as "document size, resolution, density" are selected as a condition for extracting a similar document, a stored document having similar (exact matching or partial matching) image attribute data such as "document size, resolution, density" are determined as a similar document. In the example shown in FIG. 8, with respect to the image attribute data such as "document size, resolution, density" are "A4, 600 dpi, dark" of the document to be stored, stored document (1) is extracted in a case where an exact match is determined as the condition for extracting a similar document. Furthermore, stored documents (1) and (2) are extracted in a case where a partial match for a part of the image attribute data (document size) "A4" is determined as the condition for extracting a similar document, and stored documents (1) and (3) are extracted in a case where a partial match for a part of the image attribute data (resolution) "600 dpi" is determined as the condition for extracting a similar document.

In a case where search information (comment) included in "comment column" is selected as a condition for extracting a similar document, a stored document having a similar (exact matching or partial matching) comment is determined as a similar document. In the example shown in FIG. 8, with respect to the comment "Good Day, I AM X." included in the comment column corresponding to the document to be stored, stored document (1) is extracted in a case where an exact match is determined as the condition for extracting a similar document. Furthermore, stored documents (1) and (2) are extracted in a case where a partial match for a part of a comment "Good Day" is determined as the condition for extracting a similar document.

Returning to the operation illustrated in FIG. 7, after the condition(s) for extracting similar documents is determined in step S304, similar documents are extracted by searching all of the stored documents according to the determined condition(s) (Step S305).

Then, information which identifies the extracted similar documents is obtained (Step S306). The information identifying the extracted similar documents (similar document identifying information) is search information used for searching the similar documents. For example, the information identifying the similar document may be location where the similar documents are stored.

Then, the obtained similar document identifying information is associated to the document to be stored (target document) and registered in correspondence with the document (Step S307), so that the similar document identifying information can be used as search information for searching the document. The Step S307 may include the steps of preparing a list indicating the similar document identifying information (e.g., stored location) of all of the stored documents searched in Step S305, associating the items indicated in the list to the stored documents, and registering the list together with the stored documents.

Although not shown in FIG. 7, the relationship between the similar documents is a reciprocal relationship. Therefore, the document to be stored is to be registered in association with the extracted similar documents.

After the registration step (S307) is completed, the operation illustrated in FIG. 7 is completed.

Although FIG. 7 shows an exemplary operation for registering search information corresponding to image data of a document input (scanned) by the copier function or the scanner function of the MFP 100, image data may be input from other paths besides from the scanner 18. For example, image data of a document may be input in the form of a printing command in a PDL format, in the form of facsimile data, or in the form of electronic mail from an outside apparatus via a network (e.g., LAN).

In a case of registering search information corresponding to image data of a document received in the form of a printing command in a PDL format, the image data are subjected to the same above-described processes performed on the image data of a document input by scanning. That is, after image data of a target document are obtained by decoding a PDL command, the image data are analyzed based on the above-described search condition (2), similar documents are extracted based on the analysis result, and search information extracted from the similar document is registered in association with the target document to be stored.

Moreover, in a case of registering search information corresponding to image data of a document received by facsimile or by electronic mail, the image data are subjected to the same above-described processes performed on the image data of a document input by scanning. That is, the image data are analyzed based on the above-described search condition (2), similar documents are extracted based on the analysis result, and search information extracted from the similar document is registered in association with the target document to be stored.

The present invention is not limited to the specifically disclosed embodiments, and variations and modifications may be made without departing from the scope of the present invention.

The present application is based on Japanese Priority Application No. 2007-071449 filed Mar. 19, 2007, the entire contents of which are hereby incorporated herein by reference.

What is claimed is:

1. An image processing apparatus including
a data inputting part for inputting image data corresponding to a specific document,
a document storing part for converting the image data to document data for the specific document and storing therein the document data for the specific document along with other documents data, and
a stored document managing part for managing the documents data stored in the document storing part for the specific document and other documents, the image processing apparatus further comprising:
an analyzing part configured to analyze the input image data;
a text writing part configured to obtain an analysis result from analysis by the analyzing part of the input image data and write the analysis result in a text format;

a similar document extracting part configured to determine similarity between the input image data and the documents data stored in the document storing part and extract, from the documents data stored in the document storing part, a similar document data having document identifying information similar to that of the input image data;

a searching part for searching for a target document;

wherein the stored document managing part is configured to associate the analysis result to the document data stored for the specific document in the document storing part and register the analysis result in correspondence with the document data for the specific document;

wherein the stored document managing part is further configured to associate the document identifying information to the input image data and the extracted similar document data and register the document identifying information in correspondence with the document data stored for the specific document in the document storing part;

wherein the searching part is configured to search for the target document by referring to the registered analysis result.

2. The image processing apparatus as claimed in claim 1, wherein the similar document extracting part includes a part configured to determine the similarity according to match of the registered analysis result.

3. The image processing apparatus as claimed in claim 1, wherein the image data includes bitmap data.

4. The image processing apparatus as claimed in claim 1, wherein the searching part searches for the target document based on specified document identifying information, and when the specified document identifying information matches that of a matching document data stored in the document storing part, the document storing part outputs the image data associated with the matching document data that matches the specified document identifying information.

5. The image processing apparatus as claimed in claim 1, wherein the document identifying information associated with the input image data includes pattern information specifying a specific pattern image.

6. The image processing apparatus as claimed in claim 1, wherein the input image data is stored by the document storing part in document format as an electronic document comprised of the document data including the image data.

7. The image processing apparatus as claimed in claim 1, further comprising a document reading part that reads a paper document and generates the image data from reading the paper document.

* * * * *